United States Patent
Rohde et al.

(10) Patent No.: US 12,134,803 B2
(45) Date of Patent: Nov. 5, 2024

(54) PROCESS FOR THE RECYCLING OF SPENT LITHIUM ION CELLS

(71) Applicant: BASF SE, Ludwigshafen (DE)

(72) Inventors: Wolfgang Rohde, Ludwigshafen (DE); Torben Adermann, Ludwigshafen (DE); Kerstin Schierle-Arndt, Ludwigshafen (DE); Birgit Gerke, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 975 days.

(21) Appl. No.: 17/250,339

(22) PCT Filed: Jul. 9, 2019

(86) PCT No.: PCT/EP2019/068357
§ 371 (c)(1),
(2) Date: Jan. 7, 2021

(87) PCT Pub. No.: WO2020/011765
PCT Pub. Date: Jan. 16, 2020

(65) Prior Publication Data
US 2021/0324495 A1 Oct. 21, 2021

(30) Foreign Application Priority Data
Jul. 10, 2018 (EP) .................................. 18182709

(51) Int. Cl.
| | | |
|---|---|---|
| *H01M 10/54* | (2006.01) | |
| *C22B 1/00* | (2006.01) | |
| *C22B 3/00* | (2006.01) | |
| *C22B 7/00* | (2006.01) | |
| *C22B 26/12* | (2006.01) | |

(52) U.S. Cl.
CPC .............. *C22B 7/007* (2013.01); *C22B 1/005* (2013.01); *C22B 23/043* (2013.01); *C22B 23/0453* (2013.01); *C22B 26/12* (2013.01); *H01M 10/54* (2013.01)

(58) Field of Classification Search
CPC ....... C22B 7/007; C22B 1/005; C22B 23/043; C22B 23/0453; C22B 26/12; C22B 7/006; C22B 23/0415; C22B 23/0461; C22B 47/00; H01M 10/54; Y02P 10/20; Y02W 30/84
See application file for complete search history.

(56) References Cited

U.S. PATENT DOCUMENTS

| | | | | |
|---|---|---|---|---|
| 2013/0287621 A1* | 10/2013 | Fujita | ...................... | C22C 19/07 |
| | | | | 75/401 |
| 2014/0017621 A1 | 1/2014 | Iida et al. | | |
| 2019/0032171 A1* | 1/2019 | Quix | ....................... | C22B 7/003 |
| 2019/0376159 A1* | 12/2019 | Suetens | ................... | C22B 7/001 |
| 2020/0331002 A1* | 10/2020 | Kochhar | ................ | B02C 23/36 |

FOREIGN PATENT DOCUMENTS

| | | |
|---|---|---|
| CN | 105 907 989 A | 8/2016 |
| JP | 2005-026088 A | 1/2005 |
| JP | 2012-204000 A | 10/2012 |
| JP | 2012-229481 A | 11/2012 |
| JP | 2017-115179 A | 6/2017 |
| KR | 2014-0126943 A | 11/2014 |

OTHER PUBLICATIONS

International Search Report dated Oct. 18, 2019 for International Application No. PCT/EP2019/068357.
Weiguang LV, et al.: "A Critical Review and Analysis on the Recycling of Spent Lithium-Ion Batteries", Sustainable Chemistry & Engineering, vol. 2018, No. 6, Dec. 13, 2017 (Dec. 13, 2017), pp. 1504-1521, XP002785413.

* cited by examiner

*Primary Examiner* — Muhammad S Siddiquee
(74) *Attorney, Agent, or Firm* — Armstrong Teasdale LLP

(57) ABSTRACT

Process for the recovery of transition metal from spent lithium ion batteries containing nickel, wherein said process comprises the steps of (a) heating a lithium containing transition metal oxide material to a temperature in the range of from 200 to 900° C. in the presence of $H_2$, (b) treatment of the product obtained in step (a) with an aqueous medium, (c) solid-solid separation for the removal of Ni from the solid residue of step (b), (d) recovery of Li as hydroxide or salt from the solution obtained in step (b), (e) extraction of Ni and, if applicable, Co from the solid Ni-concentrate obtained in step (c).

20 Claims, No Drawings

PROCESS FOR THE RECYCLING OF SPENT LITHIUM ION CELLS

This application is a national stage filing under 35 U.S.C. § 371 of International Application No. PCT/EP2019/068357, filed on Jul. 9, 2019, which claims priority to European Patent Application No. 18182709.8, filed on Jul. 10, 2018; the contents of these applications are incorporated herein by reference in their entirety.

The present invention is directed towards a process for the recovery of transition metal from spent lithium ion batteries containing nickel, said process comprising the steps of
- (a) heating a lithium containing transition metal oxide material, which material contains typical impurities such as fluorine compounds (e.g inorganic fluorides) and/or compounds of phosphorous, to a temperature in the range of from 200 to 900° C. in the presence of $H_2$,
- (b) treatment of the product obtained in step (a) with an aqueous medium,
- (c) solid-solid separation for the removal of Ni from the solid residue of step (b),
- (d) recovery of Li as hydroxide or salt from the solution obtained in step (b), and optionally further
- (e) extraction of Ni and, if applicable, Co from the solid Ni-concentrate obtained in step (c).

Storing electrical energy is a subject of growing interest. Efficient storage of electric energy would allow electric energy to be generated when it is advantageous and used when and where needed. Secondary electrochemical cells are well suited for this purpose due to their rechargeability. Secondary lithium batteries are of special interest for energy storage since they provide high energy density due to the small atomic weight and the large ionization energy of lithium, and they have become widely used as a power source for many portable electronics such as cellular phones, laptop computers, mini-cameras, etc. but also for electric vehicles. Especially the growing demand for raw materials such as cobalt and nickel will cause challenges in future time.

Lifetime of lithium ion batteries is not unlimited. It is to be expected, therefore, that a growing number of spent lithium ion batteries will emerge. Since they contain important transition metals such as, but not limited to cobalt and nickel, and, in addition, lithium, spent lithium ion batteries may form a valuable source of raw materials for a new generation of lithium ion batteries. For that reason, increased research work has been performed with the goal of recycling transition metals and, optionally, even lithium from used lithium ion batteries.

Lithium ion batteries or parts of lithium ion batteries that do not meet the specifications and requirements, so-called off-spec materials and production waste, may as well be a source of raw materials.

Two main processes have been subject to raw material recovery. One main process is based upon smelting of the corresponding battery scrap followed by hydrometallurgical processing of the metallic alloy (matte) obtained from the smelting process. The other main process is the direct hydrometallurgical processing of battery scrap materials. Principles have been disclosed in WO 2017/091562 and in J. Power Sources, 2014, 262, 255 ff. Such hydrometallurgical processes will furnish transition metals as aqueous solutions or in precipitated form, for example as hydroxides, separately or already in the desired stoichiometries for making a new cathode active material. In the latter case the composition of metal salt solutions may be adjusted to the desired stoichiometries by addition of single metal components.

In WO 2017/091562, a co-precipitation of transition metals is described. In WO 2014/180743, a process of co-precipitation is described wherein ammonia or amines are used.

Starting from conversion experiments with model substances like $LiCoO_2$, JP 2012-229481 discloses a process for the recovery of metals from spent lithium ion batteries comprising a preliminary immersion step followed by high temperature oxidation, reductive roasting, aqueous treatment with filtration, and recovery of lithium carbonate from the filtrate and of transition metals from the residue.

Known methods for recovering such valuable materials typically face the problem that spent batteries, and namely the cells therein containing most of these materials, either have to be dismantled to mechanically separate constituents like electrodes and electrolyte, or contain a high level of impurities, like compounds of fluor and/or phosphorous, which must be removed to recover the desired materials in a purity that allows use in the production of new cells (battery grade materials). It was therefore an objective of the present invention to provide a process that allows the easy recovery of nickel and if present cobalt and manganese. It was another objective of the present invention to provide a method for the recovery of further valuable elements contained in battery scraps namely lithium, and carbon as graphite. It was a further objective of the present invention to provide an economic process reducing the number of expensive and/or energy consuming steps. It was a particular objective of the present invention to provide a process that allows the efficient recovery of nickel, optionally, cobalt and manganese, as well as lithium. It was a further objective of the present invention to provide a process for the recovery of said transition metals and lithium in high purity especially with low contents of copper and noble metals like Ag, Au and platinum group metals.

Accordingly, the process as defined at the outset has been found, hereinafter also referred to as inventive process or as inventive recycling process. The inventive process comprises steps defined in more detail below, hereinafter also referred to as step (a), step (b), step (c) etc.:
- (a) heating a lithium containing transition metal oxide material, which material stems from lithium ion batteries and contains fluorine compounds and/or compounds of phosphorous as impurities, to a temperature in the range of from 200 to 900° C. in the presence of $H_2$,
- (b) treatment of the product obtained in step (a) with an aqueous medium,
- (c) solid-solid separation for the removal of Ni and, if applicable, Co from the solid residue of step (b),
- (d) recovery of Li as hydroxide or salt from the solution obtained in step (b), and
- (e) extraction of Ni and, if applicable, Co from the solid Ni-concentrate obtained in step (c).

A typical process of the invention thus comprises the steps
- (a) heating a lithium containing transition metal oxide material to a temperature in the range of from 200 to 900° C. in the presence of $H_2$,
- (b) treatment of the product obtained in step (a) with an aqueous medium,
- (c) solid-solid separation for the removal of Ni from the solid residue of step (b),
- (d) recovery of Li as hydroxide or salt from the solution obtained in step (b), (e) extraction of Ni and, if applicable, Co from the solid Ni-concentrate obtained in step (c); wherein the lithium containing transition metal oxide material heated in step (a) stems from lithium ion batteries and contains fluorine in the range from 0.5 to 8, typically 1 to 8, and especially 2 to 8% by weight, and/or phosphorous in the range from 0.2% to 2% by weight, relative to the weight of the lithium containing transition metal oxide material.

Although it is possible as well to perform steps (a) to (c) in the following order (step (a), step (c) and then step (b). In a preferred embodiment of the present invention steps (a) to (c) are carried out in the above alphabetical order followed by steps (d) and (e).

Step (a) includes heating the lithium containing transition metal oxide material to a temperature in the range of from 200 to 900° C., preferably 300 to 600° C., more preferably 350 to 500° C. Since strong heating, especially under oxidative conditions, but to a lesser extent also under reductive atmosphere, tends to increase formation of insoluble species (such as $LiMnO_2$), it is preferred to generally expose the lithium containing transition metal oxide material not to temperatures of 500° C. or more (e.g. to temperatures above 450° C.). Consequently, it is preferred to keep the temperature during preparation of the lithium containing transition metal oxide material, and also in step (a), below 500° C. or even below 450° C., and preferably to keep the material in this step at a temperature from the range 350 to 450° C., especially 380 to 440° C. The atmosphere used to do the reduction contains 0.1% to 100% by volume of hydrogen. In one embodiment, it contains 3% to 50% by volume of hydrogen, the rest being a non-oxidizing gas, preferably nitrogen, argon, steam, carbon monoxide, carbon dioxide or mixtures of at least two of these gases. Preferred non-oxidizing gasses are nitrogen and steam and mixtures of nitrogen and steam. In a preferred embodiment, step (a) of present process is carried out mainly under hydrogen, for example under an atmosphere containing 35 to 100%, preferably 50 to 100%, by volume (normal conditions) of hydrogen, the rest, if present, being a non-oxidizing gas.

In one embodiment of the present invention, step (a) has a duration in the range of from 10 minutes to 30 hours, preferably 20 min to 8 hours, more preferably 30 min to 4 hours. Of special technical interest is a duration of step (a) lasting 20 to 90 minutes, especially 30-60 minutes.

The concentration of hydrogen in the reduction atmosphere and the reaction time are depend-ent on each other. Usually a low concentration of hydrogen requires longer reduction times and vice versa.

In a preferred process of the invention, step (a) is thus carried out by heating the lithium containing transition metal oxide material to a temperature in the range of from 350 to 450° C. in the presence of more than 35%, especially 50-100%, by volume of $H_2$, and for a time period of 20 to 90 minutes. Within the present invention, a particularly preferred process conducts step (a) using a temperature between 400 and 420° C. for up to 2.5 hours (especially about 30 to 60 minutes) and 35 or more volume-% of hydrogen to recover Li in an especially efficient way; applying too high temperatures likely results in lower yields, longer duration does not lead to a negative effect but tends to lower the space time yield, while $H_2$ concentrations 35 vol-% trans-late into short reaction times 2.5 h and are therefore favored; an optimum space time yield is achievable using pure hydrogen.

In one embodiment of the present invention the reduction conditions related to the hydrogen concentration and the duration of step (a) are chosen that at least a part of the lithium containing transition metal oxide material contains para- ferro- or ferrimagnetic components that can be separated by the application of a magnetic field. Preferred is the formation of ferro- or ferrimagnetic components resulting from the at least partial reduction of the lithium containing transition metal material. The extend of the reduction may vary in the range between 1 to 100% with respect to the nickel contained in the lithium containing transition metal material preferred is a range from 80 to 100%.

Said lithium containing transition metal oxide material is a material that stems from lithium ion batteries or parts of lithium ion batteries. Typically, said lithium containing transition metal oxide material is obtained after mechanic removal of casing, wiring or circuitry, thus typically consisting mainly of the cell material. For safety reasons, such lithium ion batteries are discharged completely, e.g. by immersion in a dry conductive bath such as metal shreds, or in a controlled way allowing to feed the current into an electricity net e.g. via an inverter. Otherwise, shortcuts may occur that constitute fire and explosion hazards. Such lithium ion batteries may be disassembled, punched, milled, for example in a hammer mill, or shredded, for example in an industrial shredder.

It is advantageous to at least partially remove electrolytes before starting step (a), especially electrolytes that comprise an organic solvent or a mixture of organic solvents, for example by drying, for example at temperatures in the range of from 50 to 250° C. under atmospheric pressure or below. As noted above, the lithium containing transition metal oxide material is preferably not exposed to higher temperatures (especially 400° C. or more) under oxidizing conditions before subjecting it to present step (a).

In one embodiment of the present invention, said lithium containing transition metal oxide material is from battery scraps. In a preferred embodiment of the present invention, said lithium containing transition metal oxide material is from mechanically treated battery scraps, for example from battery scraps treated in a hammer mill or in an industrial shredder. Such lithium containing transition metal oxide material may have an average particle diameter (D50) in the range of from 1 μm to 1 cm.

In one embodiment of the present invention, prior to step (a) a step (a1) is performed, said step (a1) comprising the removal of e.g. carbon or organic polymers by a solid-solid separation method. Examples of such solid-solid separation methods are electro-sorting, sieving, magnetic separation or other classification methods. The solid-solid separation can be performed dry or in the presence of a suitable dispersing medium, preferably water.

In one embodiment of the present invention the mechanically treated battery scrap is ground prior to step (a). Such grinding is preferably performed in ball mills or stirred ball mills. The milling can be performed under wet or dry conditions, preferred are dry conditions.

In one embodiment of the present invention, the mechanically treated battery scrap is subjected to a solvent treatment in order to dissolve and separate polymeric binders used to bind the lithium transition metal oxides to the current collector films. Suitable solvents are N-methylpyrrolidone, N,N-dimethylformamide, N,N-dimethylacetamide, and N-ethylpyrrolidone, dimethylsulfoxide, hexamethyl phoshoramide, tetramethylurea, trimethylphosphate and tri-ethylphosphate in their pure form or as mixtures.

The solvent treatments described above can be performed with one or more solvents in consecutive steps or in one step employing a solvent that is capable to dissolve electrolyte components and the binder polymers. The solvents are applied in a temperature range from 10° C. to 200° C. Especially the dissolution of polymers may require elevated temperatures in the range from 50 to 200° C. preferably between 100 and 150° C. The upper temperature is usually limited by the boiling point of the solvent unless pressures higher than 1 bar are applied.

In one embodiment the washing of mechanically treated battery scrap is performed with non-protic solvents in the absence of humidity, e.g., under dry gases like dry air, dry nitrogen.

In one embodiment of the present invention, said lithium containing transition metal oxide material does not contain a major amount of impurities such as, but not limited to, other parts or materials from parts of a lithium ion battery. Such lithium containing transition metal oxide material may include off-spec material.

However, said lithium containing transition metal oxide material preferably contains in the range of from 0.1 to 80% by weight of compounds other than nickel compounds such as nickel/cobalt components or nickel/cobalt/manganese or nickel/cobalt/aluminum compounds, if applicable, and in extreme cases the valuable material is a minority component. Examples of such components are carbon in electrically conductive form, hereinafter also referred to as conductive carbon, for example graphite, soot, and graphene. Further examples of impurities are copper and its compounds, aluminum and compounds of aluminum, for example alumina, iron and iron compounds, zinc and zinc compounds, silicon and silicon compounds, for example silica and oxidized silicon $SiO_y$ with zero<$y\le2$, tin, silicon-tin alloys, and organic polymers such as polyethylene, polypropylene, and fluorinated polymers, for example polyvinylidene fluoride, tetrafluoroethylene polymers and the like. Further impurities include fluorine compounds, e.g inorganic fluorides, and compounds of phosphorous that may stem from liquid electrolytes, for example in the widely employed $LiPF_6$ and products stemming from the hydrolysis of $LiPF_6$. Battery scraps that serve as starting material for the inventive process may stem from multiple sources, and therefore said lithium containing transition metal oxide material in most of the embodiments contains compounds other than nickel/cobalt compounds or nickel/cobalt/manganese or nickel/cobalt/aluminum components, if applicable, one of such components being carbon in electrically conductive form in the range of from 2 to 65% by weight, referring to entire lithium containing transition metal oxide material.

In a preferred embodiment of the present invention, said lithium containing transition metal oxide material contains in the range of from 20 ppm to 3% by weight of copper, as metal or in form of one or more of its compounds.

In a preferred embodiment of the present invention, said lithium containing transition metal oxide material contains in the range of from 100 ppm to 15% by weight of aluminum, as metal or in form of one or more of its compounds.

In a preferred embodiment of the present invention, said lithium containing transition metal oxide material contains in the range of from 100 ppm to 5% by weight of iron, as metal or alloy or in form of one or more of its compounds.

In a preferred embodiment of the present invention, said lithium containing transition metal oxide material contains in the range of from 20 ppm to 2% by weight of zinc, as metal or alloy or in form of one or more of its compounds.

In a preferred embodiment of the present invention, said lithium containing transition metal oxide material contains in the range of from 20 ppm to 2% by weight of zirconium, as metal or alloy or in form of one or more of its compounds.

In a preferred embodiment of the present invention, said lithium containing transition metal oxide material contains in the range of from 0.5 to 8, typically 1 to 8, and especially 2% to 8% by weight of fluorine, calculated as a sum of organic fluoride, e.g., bound in polymers, and inorganic fluoride in one or more of its inorganic fluorides.

In a preferred embodiment of the present invention, said lithium containing transition metal oxide material contains in the range of from 0.2% to 2% by weight of phosphorus. Phosphorus may occur in one or more inorganic compounds.

Each of the percentages given above are by weight of the dry material (i.e. lithium containing transition metal oxide material).

Said lithium containing transition metal oxide material contains nickel and cobalt. Examples of lithium containing transition metal oxide materials may be based on lithiated nickel cobalt manganese oxide ("NCM") or on lithiated nickel cobalt aluminum oxide ("NCA") or mixtures thereof.

Examples of layered nickel-cobalt-manganese oxides are compounds of the general formula $Li_{1+x}(Ni_aCo_bMn_cM^1_d)_{1-x}O_2$, with $M^1$ being selected from Mg, Ca, Ba, Al, Ti, Zr, Zn, Mo, V and Fe, the further variables being defined as follows:
zero$\le x \le 0.2$
$0.1 \le a \le 0.8$,
Zero$\le b \le 0.99$; typically zero$\le b \le 0.5$, preferably $0.05 < b \le 0.5$,
zero$\le c \le 0.6$,
zero$\le d \le 0.1$, and a+b+c+d=1.

In a preferred embodiment, in compounds according to general formula (I)

$$Li_{(1+x)}[Ni_aCo_bMn_cM^1_d]_{(1-x)}O_2 \qquad (I)$$

$M^1$ is selected from Ca, Mg, Zr, Al and Ba,
and the further variables are defined as above.

Examples of lithiated nickel-cobalt aluminum oxides are compounds of the general formula
$Li[Ni_hCo_iAl_j]O_{2+r}$. Typical values for r, h, i and j are:
h is in the range of from 0.8 to 0.90,
i is in the range of from 0.15 to 0.19,
j is in the range of from 0.01 to 0.05, and
r is in the range of from zero to 0.4.

Particularly preferred are $Li_{(1+x)}[Ni_{0.33}Co_{0.33}Mn_{0.33}]_{(1-x)}O_2$, $Li_{(1+x)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.1}]_{(1-x)}O_2$, $Li_{(1+x)}[Ni_{0.8}Co_{0.1}Mn_{0.1}]_{(1-x)}O_2$ each with x as defined above, and $Li[Ni_{0.85}Co_{0.13}Al_{0.02}]O_2$.

Said lithium containing transition metal oxide material may have a regular shape but usually it has an irregular shape. It is preferred, though, to remove a light fraction such as housing parts from organic plastics and aluminum foil or copper foil as far as possible, for example in a forced stream of gas.

In one embodiment the composition of the atmosphere is changed during step (a) this may be done for example in the case that volatile organic compounds are present in the feed that will be stripped off at an inert atmosphere before switching the atmosphere to a hydrogen containing one.

In one embodiment an oxidizing atmosphere in a temperature range between 20 to 350° C. is employed in step (a) prior to the reduction with a hydrogen containing atmosphere. By this embodiment, some impurity components namely organic components may be burned off, or the material is dried (especially employing temperatures up to 250° C. as noted further above. Preferred oxidizing gases are oxygen or oxygen containing gases e.g. air. The material stemming from spent lithium ion battery cells, containing lithium, transition metal oxide and further a fluorine and/or phosphorous compound, is preferably not subjected to oxidization above 350° C. carrying out the steps of present process.

In one embodiment a non-oxidizing and non-reducing atmosphere in a temperature range between 20 to 900° C., especially 20 to 450° C., is employed in step (a) prior to the reduction with a hydrogen containing atmosphere. By this, volatile compounds may be stripped off. Preferred gases are inert gases like nitrogen and argon or carbon dioxide.

In one embodiment of the present invention, step (a) is performed in the presence of steam in a temperature range between 100 and 900° C., such as temperature ranges specified above for step (a). Steam may also be added when volatile organic compounds are stripped-off prior to the reduction under a hydrogen containing atmosphere.

In one embodiment of the present invention, step (a) is performed in the presence of lime, quartz or silicate(s) or silica, or mixtures thereof lime and silica being preferred. Lime may be selected from slaked lime and quicklime or burnt lime. In a preferred embodiment of the present invention, step (a) is performed in the presence of 2 to 40% by weight of lime or quartz or silicate or silica, referring to lithium containing transition metal oxide material. When employing such compounds a heat treatment prior to the reduction with an hydrogen containing atmosphere as described above may be advantageous. Such heat treatment may be performed under any of the atmospheres mentioned above preferred are inert gases that may also containing steam.

Step (a) may be performed in any kind of oven that allows the introduction of hydrogen or different gases. These ovens may be operated batch wise or continuously. Preferred ovens are rotary kilns and fluidized bed reactors. These reactors may be operated continuously. Different gas compositions may be applied in consecutive ovens or kilns or in consecutive sections of the kiln.

In the latter case the gases are introduced in a way that no intermixing of reactive gases can occur.

After having performed step (a), the heat-treated said lithium containing transition metal oxide material is cooled down, for example to room temperature or somewhat above room temperature, for example 25 to 90° C.

In one embodiment of the present invention, prior to step (b) a step (b1) is performed, said step (b1) comprising the removal of e.g. carbon or organic polymers by a dry solid-solid separation method. Examples of such dry solid-solid separation methods are electro-sorting, sieving, magnetic separation or other classification methods. Here step (b1) is introduced as an additional step. As mentioned above a dry solid-solid separation may be sufficient to separate the Ni containing solid material from the solid residue obtained in step (a). In this case the sequence of steps (b) and (c) being inverted the Ni containing solid residue obtained after the aqueous treatment is directly leached to extract Ni and if applicable other transition metals.

Step (b) of the inventive process includes treating said heat-treated lithium containing transition metal oxide material the material obtained in step (a) or the corresponding fraction of step (b1)—with an aqueous medium able to selectively dissolve Li-components formed in step (a) without dissolving the transition metals contained in the heat treated material. This treatment can be performed at ambient temperature or higher temperatures for example in a range between 20 to 150° C. When employing temperatures above the boiling point of water the treatment is done at elevated pressures.

In one embodiment of the present invention the aqueous medium employed contains weak acids for example carbonic acid, obtained by dissolving carbon dioxide in water at atmospheric or higher pressures, formic or acetic acid or sulfurous acid. These acids are employed in concentrations of 0.1 to 10 w % in water, preferably in concentrations of 1 to 10 w %. When employing carbonic acid it is preferred to employ it under a pressure of carbon dioxide of 10 to 150 bar. In an embodiment of special technical interest, the aqueous medium of step (b) neither contains a weak acid nor carbon dioxide or carbonic acid.

In one embodiment of the present invention the aqueous medium employed in step (b) is water, for example deionized water. In one embodiment of the present invention the aqueous medium employed in step (b) is aqueous formic acid.

In one embodiment of the present invention the solid residue from step (a) or the lithium containing transition metal material fraction obtained in step (b1) is first treated with water and secondly treated with a diluted weak acid as described above after a solid-liquid separation for example a filtration after the water treatment. Both extracts may be kept separate in order to separate the different Li-species dissolved.

In one embodiment of the present invention, step (b) has a duration in the range of from 20 minutes to 10 hours, preferably 1 to 3 hours.

In one embodiment step (b) is performed at least twice to reach an optimum recovery of lithium hydroxide or the lithium salt. Between each treatment a solid-liquid separation is performed. The obtained lithium salt solutions may be unified or treated separately to recover the solid lithium salts. The latter may be advantageous in case of different lithium salts of different solubility. In this case the first extract will contain mainly the highly soluble lithium salts while the consecutive extracts will contain less soluble salts in lower concentration.

In one embodiment of the present invention, the ratio of the aqueous medium to material obtained in step (a) or (b1) is in the range of from 1:1 to 99:1, preferably 2:1 to 9:1 by weight.

In one embodiment of the present invention, the material obtained from step (a) or (b1) is ground prior to step (b) in order to de-agglomerate different solid particles from one another in cases that these are somehow agglomerated, for example by residual binder polymers. Such grinding is preferably performed in ball mills or stirred ball mills. The grinding can be performed under dry or wet conditions. Preferably the grinding is done in an aqueous medium that is also employed in the consecutive step (b).

At the end of step (b), the pressure may be released if applicable. An aqueous solution containing LiOH, $LiHCO_3$ and/or $Li_2CO_3$ or the Li-salts of the acids employed in step (b) is obtained.

The solid residue is contained in the aqueous solution forming a suspension. In the case that the extraction of the Li-compound(s) is done in two or more steps as described above the solid residue will be contained in the slurry of the second or last step, respectively.

In a preferred embodiment of the present invention the solid residue obtained from step (b) dispersed in the Li-salt solution is recovered by a solid-liquid separation step. This can be a filtration or centrifugation or a kind of sedimentation and decantation. In order to recover such solid material fine particles, for example with an average diameter of 50 μm or less, flocculants may be added, for example polyacrylates. The solid residue obtained from the solid-liquid separation is dispersed in water.

The solid residue dispersed in the aqueous medium, e.g. in the Li-salt solution or in water as described above, is then treated according to step (c). By performing step (c), nickel, and Co if applicable, is recovered as a solid containing nickel (and Co if applicable).

Step (c) of the present invention comprises a solid-solid separation step. In a preferred embodiment it is a wet solid-solid separation step. This solid-solid separation step serves to separate non-soluble components like carbon and polymers or insoluble inorganic components for example metal particles or metal oxide particles from the metallic or metal oxide components of the lithium containing transition metal oxide material. After the solid-solid separation of step (c), a solid concentrate fraction is obtained containing the majority of the Ni and if applicable of the Co in enriched form. Such solid-solid separation step may be performed by mechanical, column or pneumatic, or hybrid flotations. In many embodiments, collector compounds are added to the slurry which render the target components hydrophobic. Typical collector compounds for carbon and polymer particles are hydrocarbons or fatty alcohols which are introduced in amounts of 1 g to 50 kg/t of the heat treated lithium containing transition metal oxide material from step (a). It is also possible to perform the flotation in an inverse sense i.e. transforming the originally hydrophilic components into strongly hydrophobic components by special collector substances, e.g., fatty alcohol sulfates or esterquats. Preferred is the direct flotation employing hydrocarbon col-lectors for example mineral oils, kerosene or Diesel. In order to improve the selectivity of the flotation towards carbon and polymer particles suppressing agents can be added that reduce the amounts of entrained metallic and metal oxide components in the froth phase. Agents that can be used may be acids or bases for controlling the pH value in a range of from 3 to 9. It may also be ionic components that adsorb on the metallic or metal oxide surface e.g. sodium silicate or bipolar components like, for example, amino acids. In order to increase the efficiency of the flotation it may be advantageous to add carrier particles that form agglomerates with the hydrophobic target particles, e.g., polymer particles, carbonaceous particles, for example graphite or coal. By using magnetic carrier particles magnetic agglomerates may be formed that can be separated magnetically. In the case that the target components are paramagnetic, fern- or ferromagnetic it is also possible to separate these components by a magnetic separation employing high intensity magnetic separators ("WHIMS"), medium intensity magnetic separators ("MIMS") or low intensity magnetic separators ("LIMS"). Other solid-solid separation techniques make use of the density difference of the solid constituents for example the density difference between graphite and metals or metal oxides. These techniques comprise float-sink methods employing fluids of densities intermediate to the densities of the solid components that will be separated. Another technique of this sort is the heavy media separation. Further separation techniques based on density differences are spirals and hydrocyclones.

Also, combinations of at least two of the afore mentioned solid-solid separation techniques may be employed.

In one preferred embodiment the solid-solid separation in step (c) is a magnetic separation.

In one embodiment of the present invention the material obtained from step (b) is ground prior to step (c) in order to liberate the different solid particles from one another in cases that these are somehow agglomerated for example by residual binder polymers. Such grinding is preferably performed in ball mills or stirred ball mills.

In one embodiment of the present invention, step (c) is a wet solid-solid separation employing an aqueous medium preferably water as fluid. The ratio of the fluid medium to solid material obtained in step (b) is in the range of from 1:1 to 99:1, preferably 2:1 to 9:1 by weight.

From the wet solid-solid separation of step (c) result two slurries one containing the target transition metal containing solid material and one that contains the other components like carbonaceous materials and polymers and if applicable also some inorganic compounds. By suitable selection and if necessary combination of solid-solid separation steps at least 60% of the Ni is obtained and concentrated in one fraction. Preferably at least 80 to 99% of the Ni is separated.

In one embodiment of the present invention the liquid phase of the slurry fed to step (c) contains dissolved lithium. In this case one or the other or both slurries obtained from the solid-solid separation in step (c) are subjected to a solid-liquid separation in order to recover the lithium solution. The lithium solution is then further treated in step (d).

In step (d), the solution obtained from any of the foregoing steps, which contains lithium, is treated to recover the lithium as hydroxide or salts in form of solid materials.

In one embodiment of the present invention the Li-salts or LiOH are recovered by evaporation of the water contained in the solution. It is advantageous to neutralize residual acid by addition of stoichiometric amounts of LiOH or $Li_2CO_3$ or by addition of ammonia.

In one embodiment of the present invention Li is recovered from the Li-salt solution by precipitation as Li-carbonate by the addition of sodium carbonate or ammonium carbonate, or by carbonic acid formed by the dissolution of carbon dioxide, preferably under pressure.

In a preferred embodiment of the present invention, Li is recovered as LiOH.

The obtained solid Li-salts and/or LiOH may be further purified by dissolution and recrystallization as known in the art.

The solid Ni-concentrate obtained from step (c) is subjected to a step (e) allowing the extraction of Ni and, if applicable of Co, and if applicable other valuable metals such as lithium contained in the Ni-concentrate. For the extraction, smelters or acids or ammonium carbonate may be applied.

In one embodiment of the present invention such step (e) can be pyrometallurgical by smelting the solid Ni-concentrate obtained in step (c) as such or as co-feed within a smelter dedicated to Ni-concentrates from mining production.

In the course of step (e), the transition metal material is treated with a leaching agent, which is preferably an acid selected from sulfuric acid, hydrochloric acid, nitric acid, methanesulfonic acid, oxalic acid and citric acid or a combination of at least two of the foregoing, for example a combination of nitric acid and hydrochloric acid. In another preferred form the leaching agent is an inorganic acid such as sulfuric acid, hydrochloric acid, nitric acid, an organic acid such as methanesulfonic acid, oxalic acid, citric acid, aspartic acid, malic acid, ascorbic acid, or glycine, a base, such as ammonia, aqueous solutions of amines, ammonia, ammonium carbonate or a mixture of ammonia and carbon dioxide, or a chelating agent, such as EDTA or dimethylglyoxime.

In one form, the leaching agent comprises an aqueous acid, such as an inorganic or organic aqueous acid. In another form the leaching agent comprises a base, preferable ammonia or an amine. In another form the leaching agent comprises a complex former, preferably a chelating agent. In another form the leaching agent comprises an inorganic acid, an organic acid, a base or a chelating agent.

The concentration of leaching agents may be varied in a wide range, for example of 0.1 to 98% by weight and preferably in a range between 10 and 80%. Preferred example of aqueous acids is aqueous sulfuric acid, for example with a concentration in the range of from 10 to 98% by weight. Preferably, aqueous acid has a pH value in the range of from −1 to 2. The amount of acid is adjusted to maintain an excess of acid referring to the transition metal. Preferably, at the end of step (e) the pH value of the resulting solution is in the range of from −0.5 to 2.5. Preferred examples of a base as leaching agents are aqueous ammonia with a molar NH3 to metal (Ni, Co) ratio of 1:1 to 6:1, preferably 2:1 to 4:1, preferably also in the presence of carbonate or sulfate ions. Suitable chelating agents like EDTA or dimethylglyoxime are often applied in a molar ratio of 1:1 to 3:1.

The leaching may be carried out in the presence of oxidizing agents. A preferred oxidizing agent is oxygen as pure gas or in mixtures with inert gases e.g. nitrogen or as air. Other oxidizing agents are oxidizing acids e.g. nitric acid.

In one embodiment of the present invention such step (e) can be performed by dissolving the solid Ni-concentrate obtained in step (c) in an acid selected from sulfuric acid, hydrochloric acid, nitric acid, methane sulfonic acid, oxalic acid and citric acid.

In one embodiment of the present invention such step (e) may be performed by treating the solid Ni-concentrate obtained in step (c) with an aqueous solution of ammonium carbonate or ammonium bicarbonate. Such aqueous solution may contain additional ammonia.

In one embodiment of the present invention the Ni-concentrate obtained from step (c) is treated in step (e) with an acid selected from sulfuric acid, hydrochloric acid, nitric acid, methanesulfonic acid, oxalic acid and citric acid or a combination of at least two of the foregoing, for example a combination of nitric acid and hydrochloric acid. In the case of aqueous acids the concentration of acid may be varied in a wide range, for example of 0.1 to 99% by weight preferably in a range between 10 and 96%. The amount of acid is adjusted to maintain an excess of acid.

Preferably, at the end of step (e) the pH value of the resulting solution is in the range of from −0.5 to 2.

Preferred example of aqueous acids is aqueous sulfuric acid, for example with a concentration in the range of from 10 to 98% by weight.

The treatment in accordance with step (e) may be performed at a temperature in the range of from 20 to 200° C., especially 20 to 130° C. If temperatures above 100° C. are desired, step (e) is carried out at a pressure above 1 bar. Otherwise, normal pressure is preferred. In the context of the present invention, normal pressure means 1 atm or 1013 mbar. "Normal conditions" mean normal pressure and 20° C.

In one embodiment of the present invention, step (e) is carried out in a vessel that is protected against strong acids, for example molybdenum and copper rich steel alloys, nickel-based alloys, duplex stainless steel or glass-lined or enamel or titanium coated steel. Further examples are polymer liners and polymer vessels from acid-resistant polymers, for example polyethylene such as HDPE and UHMPE, fluorinated polyethylene, perfluoroalkoxy alkanes ("PFA"), polytetrafluoroethylene ("PTFE"), PVdF and FEP. FEP stands for fluorinated ethylene propylene polymer, a copolymer from tetrafluoroethylene and hexafluoropropylene.

The slurry obtained in step (e) may be stirred, agitated, or subjected to a grinding treatment, for example in a ball mill or stirred ball mill. Such grinding treatment leads often to a better access of water or acid to a particulate transition metal material.

In one embodiment of the present invention, step (e) has a duration in the range of from 10 minutes to 10 hours, preferably 1 to 3 hours. For example, the reaction mixture in step (e) is stirred at powers of at least 0.1 W/l or cycled by pumping in order to achieve a good mixing and to avoid settling of insoluble components. Shearing can be further improved by employing baffles. All these shearing devices need to be applied sufficiently corrosion resistant and may be produced from similar materials and coatings as described for the vessel itself.

Step (e) may be performed under an atmosphere of air or under air diluted with N2. It is preferred, though, to perform step (e) under inert atmosphere, for example nitrogen or a rare gas such as Ar.

The treatment in accordance with step (e) leads to a dissolution of the metal compounds that stem from the cathode active material, for example of said NCM or NCA including impurities other than carbon and organic polymers. In most embodiments, a slurry is obtained after carrying out step (e). Residual lithium and transition metals such as, but not limited to nickel, cobalt, copper and, if applicable, manganese, are often in dissolved form in the leach, e.g. in the form of their salts.

In one embodiment of the present invention, step (e) is performed in the presence of a reducing agent. Examples of reducing agents are organic reducing agents such as methanol, ethanol, sugars, ascorbic acid, urea, bio-based materials containing starch or cellulose, and inorganic reducing agents such as hydrazine and its salts such as the sulfate, and hydrogen peroxide. Preferred reducing agents for step (e) are those that do not leave impurities based upon metals other than nickel, cobalt, or manganese. Preferred examples of reducing agents in step (e) are methanol and hydrogen peroxide. With the help of reducing agents, it is possible to, for example, reduce $Co^{3+}$ to $Co^{2+}$ or $Mn(+IV)$ or $Mn^{3+}$ to $Mn^{2+}$.

In a preferred embodiment of the present invention, an excess of reducing agent is employed, referring to the amount of Co and Mn if applicable. Such excess is advantageous in case that Mn is present.

In a preferred embodiment of the present invention, an excess of reducing agent is employed, referring to the amount of $Co^{3+}$.

In one embodiment of the present invention, the ratio of the extraction medium, for example the acid solution and the reducing agent, if applicable, to the Ni-concentrate obtained in step (c) is in the range of from 1:1 to 99:1, preferably 2:1 to 9:1 by weight.

In embodiments wherein a so-called oxidizing acid has been used in step (e) it is preferred to add reducing agent in order to remove non-used oxidant. Examples of oxidizing acids are nitric acid and combinations of nitric acid with hydrochloric acid. In the context of the present invention, hydrochloric acid, sulfuric acid and methanesulfonic acid are preferred examples of non-oxidizing acids.

Depending on the concentration of the acid used, the leach obtained in step (e) may have a transition metal concentration in the range of from 1 up to 20% by weight, preferably 3 to 15% by weight.

In one embodiment step (e) is performed under inert gas like nitrogen or argon.

In one embodiment of the present invention the Ni-concentrate obtained from step (c) is ground prior to step (e) in order to liberate the different solid particles from one another in cases that these are somehow agglomerated for example by residual binder polymers. Such grinding is preferably performed in ball mills or stirred ball mills.

Depending on the concentration and amount of the aqueous acid used in step (e), the liquid phase obtained in step (e) may have a transition metal concentration in the range of from 1 up to 25% by weight, preferably 6 to 15% by weight. The transition metal concentration depends on the solubility of the corresponding salts of the acid employed. Preferably, step (e) is performed such that the transition metal concentrations of the main metals such as Ni and, optionally, Co and Mn are slightly below the solubility limit of the least soluble salt in order to ensure a high metal concentration in the solution.

An optional step that may be carried out after step (e) is removal of non-dissolved solids, for example carbonaceous materials and of polymers resulting from the housings of batteries. Said step may be carried out by filtration centrifugation or settling and decanting with or without addition of flocculants. The solid residue obtained may be washed with water and can be further treated in order to separate the carbonaceous and polymeric components e.g. by solid-solid separation methods as described above.

In one embodiment of the present invention step (e) and the removal of non-dissolved solids are performed sequentially in a continuous operation mode.

Having dissolved the Ni-concentrate in step (e) in a consecutive step (e1), the pH value of the above slurry or solution may be adjusted to 2.5 to 8, preferably 5.5 to 7.5 and even more preferably from 6 to 7. The pH value may be determined by conventional means, for example potentiometrically, and refers to the pH value of the continuous liquid phase at 20° C. The adjustment of the pH value is done by dilution with water or by addition of bases or by a combination thereof. Examples of suitable bases are ammonia and alkali metal hydroxides, for example Li—OH, NaOH or KOH, in solid form, for example as pellets, or preferably as aqueous solutions. Combinations of at least two of the foregoing are feasible as well, for example combinations of ammonia and aqueous caustic soda.

Preferably, an optional step (e2) comprises the removal of precipitates of carbonates, oxides, phosphates, hydroxides or oxyhydroxides of Al, Cu, Fe, Zr, Zn, Zn, or combinations of at least two of the foregoing formed in the optional step (e1). Said precipitates may form during adjustment of the pH value. Phosphates may be stoichiometric or basic phosphates. Without wishing to be bound by any theory, phosphates may be generated on the occasion of phosphate formation through hydrolysis of hexafluorophosphate or its decomposition products formed during step(a). It is possible to remove said precipitates by filtration or with the help of a centrifuge or by sedimentation. Preferred filters are belt filters, filter press, suction filters, and cross-flow filter. Filtering aids and/or flocculants may be added to improve the solid-liquid separation.

In a preferred embodiment of the present invention step (e2) includes an optional step (e3). Step (e3) includes a treatment of a solution obtained after step (e1) or step (e2) with metallic nickel, metallic cobalt or metallic manganese or any combination of at least two of the foregoing.

In optional step (e3), a solution obtained after step (e2) is contacted with metallic nickel, cobalt or manganese or a combination of at least two of the foregoing, for example in a column. In such embodiments, it is advantageous to provide a column packed with metallic nickel, metallic cobalt or metallic manganese or a combination of at least two of the foregoing in the form of lumps or granules, for example as fixed bed, and allowing a stream of the solution to flow through such column.

In one embodiment of the present invention, step (e3) is performed at normal pressure.

In one embodiment of the present invention, step (e3) has a duration in the range of from 30 minutes to 5 hours. In case step (e1) is performed in a column, the duration corresponds to the average residence time.

In one embodiment of the present invention, step (e3) is performed at a pH value range from 1 to 6, preferably pH 2 to 5. The lower the pH value in step (e1) the higher is the amount of metal selected from Ni, Co and Mn to be dissolved under hydrogen formation.

Step (e3) is particularly useful for removal of copper traces. By performing step (e3), no new impurities that would require an additional purification step are introduced into the solution of transition metals. Even if said metallic nickel, cobalt or manganese contains traces of copper they do not dissolve.

An optional step (f) includes the precipitation of the transition metals as mixed hydroxides or mixed carbonates, preferably as mixed hydroxides.

In a preferred embodiment of the present invention, step (f) is performed by adding ammonia or an organic amine such as dimethyl amine or diethyl amine, preferably ammonia, and at least one inorganic base such as lithium hydroxide, sodium hydroxide, potassium hydroxide, sodium carbonate, sodium bicarbonate, potassium carbonate or potassium bicarbonate or a combination of at least two of the foregoing. Preferred is the addition of ammonia and sodium hydroxide.

In one embodiment of the present invention, step (f) is performed at a temperature in the range of from 10 to 85° C., preferred are 20 to 50° C. In one embodiment of the present invention, the concentration of organic amine or ammonia is in the range of from 0.05 to 1 mole/l, preferably 0.1 to 0.7 mole/l. The term "ammonia concentration" in this context includes the concentration of ammonia and ammonium. Particular preference is given to amounts of ammonia for which the solubility of $Ni^{2+}$ and $Co^{2+}$ in the mother liquor is not more than 1000 ppm each, more preferably not more than 500 ppm each.

In one embodiment of the present invention, mixing is affected during step (f) of the inventive process, for example with a stirrer, a rotor stator mixer or a ball mill. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

The optional step (f) of the inventive process may be performed in the presence or absence of one or more reducing agents. Examples of suitable reducing agents are hydrazine, primary alcohols such as, but not limited to methanol or ethanol, furthermore ascorbic acid, glucose and alkali metal sulfites. It is preferred to not use any reducing agent in step (f). The use of a reducing agent or inert atmosphere or both in combination is preferred in cases where major amounts of manganese are present in the transition metal oxide material, for example, at least 3 mol-%, referring to the transition metal part of the respective cathode active material.

Step (f) of the inventive process may be performed under an atmosphere of an inert gas like e.g. nitrogen or argon or carbon dioxide.

In one embodiment of the present invention, step (f) is performed at a pH value in the range of from 9 to 13.5, preferred are pH values from 11 to 12.5 in the case of hydroxides and pH values in the range from 7.5 to 8.5 in the case of carbonates. The pH value refers to the pH value in the mother liquor, determined at 23° C.

Step (f) may be carried out in a batch reactor or preferably continuously, for example in a continuous stirred tank reactor or in a cascade of two or more, for example two or three continuous stirred tank reactors.

Step (f) of the inventive process may be performed under air, under inert gas atmosphere, for example under noble gas or nitrogen atmosphere, or under reducing atmosphere. An example of a reducing gas is, for example, $SO_2$. Preference is given to working under inert gas atmosphere, especially under nitrogen gas.

For the purpose of further purification, the solids recovered in step (f) may be dissolved in an acid, for example hydrochloric acid or more preferably sulfuric acid.

By performing the inventive process, it is possible to recover the transition metals nickel and cobalt and, if applicable, manganese from cathode materials containing nickel and cobalt and if applicable, also manganese in a form that they can be converted into cathode active materials very easily. In particular, the inventive process allows the recovery of transition metals such as nickel and cobalt and, optionally, manganese, that contain only tolerable traces of impurities such as copper, iron, and zinc, for example with less than 10 ppm of copper, preferably even less, for example 1 to 5 ppm.

In one embodiment of the present invention the solid Ni-concentrate obtained in step (c) is treated with ammonium (bi)carbonate in aqueous solution in concentrations of 0.2 to 30 wt %, preferably 1 to 20% by weight. The slurry may be heated to temperatures of 30 to 150° C. At temperatures above the boiling point of the mixture the heating is performed under pressure. Below the boiling point the application of pressure is advantageous to maintain sufficient ammonia and carbon dioxide in the system.

The treatment with ammonium (bi)carbonate may be performed under inert atmosphere or in the presence of oxygen for example under air. The leaching or solution may also contain additional ammonia and/or hydrogen peroxide.

By the ammonium (bi)carbonate treatment Ni and, if applicable, Co and Cu, will be dissolved as ammonium complexes. The concentration of the metal ammonium complexes in the leaching liquor may be in the range of 0.2 to 30 wt % by metal preferably 1-15 wt %. The solution obtained by this treatment is subjected to a solid-liquid separation resulting in a solution containing mainly the Ni and if applicable Co and Cu ammonium complexes and a separated solid residue containing mainly other transition metals if applicable namely Mn and Fe.

The solution obtained can be heated and ammonia can be stripped off by purging with carbon dioxide. By this first Ni-carbonate and upon longer treatment advantageously at increased temperature also Co-carbonate will be obtained as precipitates. This allows the separation of both metals. In one embodiment of the present invention Ni and Co carbonate are not separated from each other. The precipitated mixed Ni/Co carbonates are separated from the mother liquor and can be dissolved by sulfuric acid or other acids to obtain a solution of the corresponding Ni and if applicable Co salts. This solution may also contain small amounts of Cu-salts that may be removed by a treatment with metallic Ni, Co or Mn as described above. Other impurities like Fe or Al that may be contained in low concentrations may be removed by hydroxide or carbonate precipitation at pH-values between 2.5 to 8 as described above as well.

From the purified Ni— and if applicable Co-salt solution Ni— and Co-hydroxides may be co-precipitated.

In one embodiment of the present invention the solution is further treated to extract Ni and Co-salts separately for example by solvent extraction methods. From the separated Ni and Co salts pure metals can be recovered via electrochemical methods known in the art.

The invention is further illustrated by a working example.

The metal impurities and phosphorous were determined by elemental analysis using ICP-OES (inductively coupled plasma optical emission spectroscopy) or ICP-MS (inductively coupled plasma mass spectrometry). Total carbon was determined with a thermal conductivity detector (CMD) after combustion. Fluorine was detected with an ion-sensitive electrode (ISE) after combustion for total fluorine or after $H_3PO_4$ distillation for ionic fluoride. Phase compositions of solids were determined with powder x-ray diffractometry (PXRD).

Nl: normal liter, liter at normal conditions (1 atm, 20° C.).

Percentages refer to % by weight unless specifically defined otherwise. The expressions % by weight and wt % may be used interchangeably. Wherever mentioned, the terms "room temperature" and "ambient temperature" denote a temperature between about 18 and 25° C.

EXAMPLE 1

Step (a.1) Heat-Treatment in the Presence of $H_2$

An amount of 60 g mechanically treated battery scrap containing
- 32.8 g spent cathode active material containing nickel, cobalt and manganese in similar molar amounts,
- 17.5 g of organic carbon in the form of graphite and soot and residual electrolyte, and
- 9.7 g of further impurities comprising Al (0.6 g), Cu (0.5 g), F (in total: 2.2 g), Fe (0.55 g), P (0.3 g), Zn (0.04 g), Zr (0.15 g), Mg (2 mg), Ca (6 mg)
- was placed in a graphite crucible in a tube furnace and heated to 400° C. in the course of 45 minutes under a flow of argon (20 Nl/h). The temperature was kept constant for 7.5 hours under a flow (22 Nl/h) of 10 wt % hydrogen in argon until the flow of hydrogen was stopped and the furnace was left to cool to ambient temperature under a flow of argon. 50.1 g of heat treated material was recovered from the crucible, showing XRD signals of Ni/Co alloy, graphite, and LiOH.

Step (b.1) Aqueous Treatment of the Product Obtained in Step (a.1)

5.5 g of the material obtained in step (a.1) was slurried in 53 mL deionized water and stirred for 30 min at ambient temperature and then filtered. The clear filtrate was found to contain 133 mg $Li^+$, 212 mg hydroxide anions, 93 mg carbonate ions and 13 mg fluoride ions. This corresponds to a lithium leaching efficiency of 46% with 65% of the lithium being present as LiOH.

Step (c.1) Solid-Solid Separation for the Removal of Ni from the Solid Residue of Step (b.1)

An amount of 12 g of the hydrogen treated material obtained from step (a.1) were slurried in 100 ml deionized water and dispersed for 10 minutes with a blade stirrer at 800 rpm under assistance of a sonotrode. The slurry was introduced into a lab-scale high intensity wet magnet separator series L model 4 from Eriez Magnetics Europe Ltd. Steel wool was placed between the poles of the separator in a canister. The feed slurry was pumped to the matrix within 5 min while keeping the matrix magnetized with 1 Tesla. The attached solids were rinsed with deionized water until a clear and colorless solution is obtained from the outlet to fully recover the non-magnetic fraction. After removing the electric field, the magnetic fraction was removed from the canister by again rinsing with deionized water. Both recovered slurries were filtered and dried in an oven giving 9.0 g of a magnetic fraction and 1.25 g of a non-magnetic fraction. The non-magnetic fraction contained 86 wt % carbon and less than 0.2 wt % inorganic and organic fluorine. The Ni, Co and Mn metal content in the magnetic fraction was 52 wt %.

Step (d.1): Recovery of Li Salt from the Solution Obtained in Step (b.1)

31.5 g of the clear filtrate obtained in step (b), containing a total amount of 79 mg lithium ions, was concentrated to dryness under reduced pressure. The flask was refilled with dry nitrogen and transferred into an argon filled glovebox. 215 mg of solid material were recovered, showing X-ray diffraction signals of predominantly LiOH and traces of $Li_2CO_3$.

Step (e.1): Acidic Extraction of Ni and Co from the Solid Ni-Concentrate Obtained in Step (c.1)

In a stirred 250 mL batch reactor, 3.0 g of material obtained as magnetic fraction from step (c.1) were suspended in 50 g deionized water and heated to 40° C. A mixture of 33.4 g $H_2SO_4$ (96% $H_2SO_4$) in 20.0 g deionized water was added slowly, followed by a mixture of 3.62 g $H_2SO_4$ (96% $H_2SO_4$), 1.2 g aqueous hydrogen peroxide (30% $H_2O_2$) in 3.47 g deionized water. Slow gas evolution was observed with only minor formation of foam. The resultant slurry was stirred at 60° C. for 3 hours and then cooled to ambient temperature. The resulting mixture was filtered with a glass frit and the solid residue was washed with 62.2 g deionized water. 111.4 g of a red colored clear filtrate were recovered, containing 535 mg Ni, 535 mg Co, 423 mg Mn corresponding to leaching efficiencies of more than 95% for each Ni, Co, and Mn.

Alternative Step (e.1): Ammoniacal Extraction of Ni and Co from the Solid Ni-Concentrate Obtained in Step (c.1)

In a stirred 250 mL batch reactor, 3.0 g of material obtained as magnetic fraction from step (c.1) are suspended in a mixture of 117 g of a 25% aqueous ammonia solution and 20 g of ammonium carbonate and 9 g of deionized water, and heated to 60° C. under stirring. 40.1 g of aqueous hydrogen peroxide (30% H2O2) are added under stirring over a period of 5 h. The reaction is exothermic with evolution of gas. The resultant slurry is stirred at 60° C. for 3 hours and then cooled to ambient temperature. The resulting mixture is filtered with a glass frit and the solid residue is washed with 60.3 g of deionized water. 204.7 g of a dark colored clear combined filtrate are recovered, containing 534 mg Ni, 520 mg Co, 2 mg Mn corresponding to leaching efficiencies of 95% and 94% for Ni and Co respectively, while the leaching efficiency of Mn is only 0.5%. Such ammoniac leaching process may be advantageous in cases where Mn may disturb subsequent separation steps.

EXAMPLE 2: STEP (A.1) HEAT-TREATMENT IN THE PRESENCE OF H2

An amount of 20 g mechanically treated battery scrap containing 55 wt.-% spent cathode active material containing nickel, cobalt and manganese in similar molar amounts, 29 wt.-% of organic carbon in the form of graphite and soot and residual electrolyte, and 16 wt.-% of further impurities comprising Al (1 wt.-%), Cu (0.8 wt.-%), F (in total: 3.7 wt.-%), Fe (0.9 wt.-%), P (0.5 wt.-%), Zn (0.07 wt.-%), Zr (0.3 wt.-%), Mg (<0.01 wt.-%), Ca (0.01 wt.-%) is placed in a rotary oven and heated to 400, 410, 420, 430, 450, 470, 500° C., respectively, in the course of 45 minutes under a flow of argon (20 Nl/h). At the respective temperature, the temperature is kept constant for further 45 min under a flow of hydrogen (100%, 20 Nl/h). Afterwards, the flow of hydrogen is stopped, and the furnace left to cool to ambient temperature under a flow of argon. The heat-treated material is recovered from the oven, showing XRD signals of Ni/Co alloy, graphite, and LiOH. The amount of Li within the heated material is determined after each heating experiment.

Step (b.1) Aqueous Treatment of the Product Obtained in Step (a.1)

5 g of the material obtained in step (a.1) is slurried in 50 mL deionized water and stirred for 30 min at ambient temperature and then filtered. The clear filtrate is found to contain lithium, hydroxide, carbonate and fluoride of the below listed concentrations (Tab. 1).

TABLE 1

Experimental conditions during heat treatment under H2 and analytics of the leached filtrate.

| Temperature [° C.] | Lithium content [mg] | Carbonate content [mg] | Fluoride content [mg] | Hydroxide content [mg] | Li leaching efficiency [%] |
| --- | --- | --- | --- | --- | --- |
| 400 | 145 | 105 | 14 | 216 | 55 |
| 410 | 157 | 70 | 16 | 278 | 58 |
| 420 | 142 | 75 | 15 | 253 | 52 |
| 430 | 147 | 80 | 15 | 241 | 55 |
| 450 | 145 | 100 | 16 | 214 | 52 |
| 470 | 134 | 120 | 17 | 190 | 51 |
| 500 | 140 | 115 | 17 | 212 | 48 |

Steps (c1), (d1) and (e1) are carried out in analogy to example 1.

EXAMPLE 3: STEP (A.1) HEAT-TREATMENT IN THE PRESENCE OF H2

An amount of 20 g mechanically treated battery scrap containing 55 wt.-% spent cathode active material containing nickel, cobalt and manganese in similar molar amounts, 29 wt.-% of organic carbon in the form of graphite and soot and residual electrolyte, and 16 wt.-% of further impurities comprising Al (1 wt.-%), Cu (0.8 wt.-%), F (in total: 3.7 wt.-%), Fe (0.9 wt.-%), P (0.5 wt.-%), Zn (0.07 wt.-%), Zr (0.3 wt.-%), Mg (<0.01 wt.-%), Ca (0.01 wt.-%) is placed in a rotary oven and heated to 400° C. in the course of 45 minutes under a flow of argon (20 Nl/h). The temperature is kept constant for 15, 30, 45, 60, 150, or 450 min, as noted in Tab. 2, under a flow of hydrogen (100%, 20 Nl/h). Afterwards, the flow of hydrogen is stopped, and the furnace left to cool to ambient temperature under a flow of argon.

The heat-treated material is recovered from the oven, showing XRD signals of Ni/Co alloy, graphite, and LiOH. The amount of Li within the heated material is determined after each heating experiment.

Step (b.1) Aqueous Treatment of the Product Obtained in Step (a.1)

5 g of the material obtained in step (a.1) is slurried in 50 mL deionized water and stirred for 30 min at ambient temperature and then filtered. The clear filtrate is found to contain lithium, hydroxide, carbonate and fluoride of the below listed concentrations (Tab. 2).

TABLE 1

Heating duration in H2 atmosphere and analytics of the leached filtrate.

| Heating duration [min] | Lithium content [mg] | Carbonate content [mg] | Fluoride content [mg] | Hydroxide content [mg] | Li leaching efficiency [%] |
|---|---|---|---|---|---|
| 0 | 18 | 25 | 35 | 50 | 7 |
| 15 | 134 | 90 | 10 | 208 | 48 |
| 30 | 146 | 70 | 15 | 246 | 51 |
| 45 | 145 | 105 | 14 | 216 | 55 |
| 60 | 149 | 105 | 14 | 212 | 55 |
| 150 | 147 | 90 | 17 | 251 | 53 |
| 450 | 146 | 75 | 16 | 252 | 53 |

Steps (c1), (d1) and (e1) are carried out in analogy to example 1.

EXAMPLE 4

Step (a.3) Solvent Treatment Prior to Heat-Treatment

An amount of 750 g mechanically treated battery scrap containing 55 wt.-% spent cathode active material containing nickel, cobalt and manganese in similar molar amounts, 29 wt.-% of organic carbon in the form of graphite and soot and residual electrolyte, and 16 wt.-% of further impurities comprising Al (1 wt.-%), Cu (0.8 wt.-%), F (in total: 3.7 wt.-%), Fe (0.9 wt.-%), P (0.5 wt.-%), Zn (0.07 wt.-%), Zr (0.3 wt.-%), Mg (<0.01 wt.-%), Ca (0.01 wt.-%) is mixed with 2.5 L water and stirred for 60 min at ambient temperature and then filtered.

Step (a.1) Heat-Treatment in the Presence of H2

An amount of 20 g of the material obtained in step (a.3) is placed in a rotary oven and heated to 400° C. in the course of 45 minutes under a flow of argon (20 Nl/h). The temperature is kept constant for several hours under a flow of hydrogen/argon mixture (20 Nl/h); the hydrogen concentration is 3, 5, 7, 10, 14, 25, 35, or 100 vol-%, respectively, as noted in the below Tab. 3. Afterwards, the flow of hydrogen is stopped, and the furnace left to cool to ambient temperature under a flow of argon. The heat-treated material is recovered from the oven, showing XRD signals of Ni/Co alloy, graphite, and LiOH. The amount of Li within the heated material is determined after each heating experiment.

Step (b.1) Aqueous Treatment of the Product Obtained in Step (a.1)

5 g of the material obtained in step (a.1) is slurried in 50 mL deionized water and stirred for 30 min at ambient temperature and then filtered. The clear filtrate is found to contain lithium, hydroxide, carbonate and fluoride of the below listed concentrations (Tab. 3).

TABLE 3

H2 concentration during heating and analytics of the leached filtrate.

| H2 conc. in gas mix [vol-%] | Heating duration [h] | Lithium content [mg] | Carbonate content [mg] | Fluoride content [mg] | Hydroxide content [mg] | Li leaching efficiency [%] |
|---|---|---|---|---|---|---|
| 3 | 8 | 97 | 75 | 14 | 147 | 36 |
| 5 | 8 | 148 | 65 | 13 | 290 | 53 |
| 7 | 8 | 160 | 60 | 12 | 320 | 57 |
| 10 | 8 | 141 | 105 | 13 | 260 | 56 |
| 14 | 4 | 153 | 100 | 14 | 265 | 60 |
| 25 | 3 | 144 | 100 | 17 | 267 | 57 |
| 35 | 2.5 | 146 | 105 | 16 | 271 | 58 |
| 100 | 0.75 | 166 | 105 | 14 | 289 | 65 |

Steps (c1), (d1) and (e1) are carried out in analogy to example 1.

The invention claimed is:

1. A process for recovering transition metals from spent lithium ion batteries containing nickel (Ni), comprising the steps of:
   (a) heating a lithium containing transition metal oxide material to a temperature ranging from 200° C. to 900° C. in the presence of $H_2$, wherein the transition metal oxide material is from lithium ion batteries and contains fluorine compounds and/or compounds of phosphorous as impurities;
   (b) treating the material obtained in step (a) with an aqueous medium to form a solid residue and a solution;
   (c) removing by solid-solid separation Ni from the solid residue of step (b) forming a solid Ni-concentrate;
   (d) recovering lithium (Li) as a hydroxide or salt from the solution obtained in step (b); and
   (e) extracting Ni and/or cobalt (Co) from the solid Ni-concentrate obtained in step (c),
   wherein the lithium containing transition metal oxide material used in step (a) is from lithium ion batteries after mechanic removal of casing, wiring or circuitry and discharging, and wherein the material is not exposed to temperatures of 350° C. or more under oxidizing conditions before the heating of step (a).

2. The process according to claim 1, wherein the temperature in step (a) ranges from 350° C. to 500° C.

3. The process according to claim 1, wherein the extracting of step (e) comprises smelting of the solid Ni-concentrate obtained in step (c).

4. The process according to claim 1, wherein the extracting of step (e) comprises treating the Ni-concentrate obtained in step (c) with a base.

5. The process according to claim 3, wherein the solution containing Ni and/or Co salt, are treated with ammonia or an alkali metal hydroxide to obtain a solution with a pH-value ranging from 2.5 to 8.

6. The process according to claim 3, wherein solution containing Ni and/or Co salts are treated with metallic nickel, metallic cobalt, or metallic manganese or any combination thereof.

7. The process according to claim 1, further comprising removing carbon or organic polymers by a dry solid-solid separation prior to step (b).

8. The process according to claim 1, wherein in step (d), lithium is recovered as lithium hydroxide.

9. The process according to claim 1, wherein in step (d), lithium is recovered by way of precipitation as carbonate.

10. The process according to claim 1, further comprising an additional step (f) of precipitating Ni and/or Co and/or manganese as (mixed) hydroxide, oxyhydroxide or carbonate.

11. The process according to claim 1, wherein step (a) is performed in the presence of steam.

12. The process according to claim 1, wherein step (a) is performed in the presence of lime, quartz, silica, silicate, or any combination thereof.

13. The process according to claim 1, further comprising an additional step before step (a) of contacting the material from spent lithium ion batteries with water and/or organic solvent followed by a solid-liquid separation step.

14. The process according to claim 1, wherein step (e) comprises treating the solid Ni-concentrate obtained in step (c) with an acid.

15. The process according to claim 14, wherein the acid is chosen from sulfuric acid, hydrochloric acid, nitric acid, methane sulfonic acid, oxalic acid, citric acid, and a combination thereof.

16. The process according to claim 1, wherein step (e) comprises treating the Ni-concentrate obtained in step (c) with ammonium bicarbonate or ammonium carbonate.

17. The process according to claim 4, wherein the base is chosen from ammonia; aqueous solutions of amines, ammonia, and/or ammonium carbonate; and a mixture of ammonia and carbon dioxide.

18. The process according to claim 10, wherein step precipitating in (f) comprises adding at least one agent chosen from lithium hydroxide, sodium hydroxide, ammonia, and potassium hydroxide.

19. The process according to claim 10, wherein precipitating in step (f) is by raising a pH above 8.

20. The process according to claim 2, wherein 35% by volume or more of $H_2$ is present in step (a) and the temperature in step (a) ranges from 350° C. to 450° C.

* * * * *